March 15, 1966 N. W. FRANDEEN 3,240,399
DISPENSING RECEPTACLE
Filed Aug. 14, 1963
FIG. 1
FIG. 2
FIG. 3
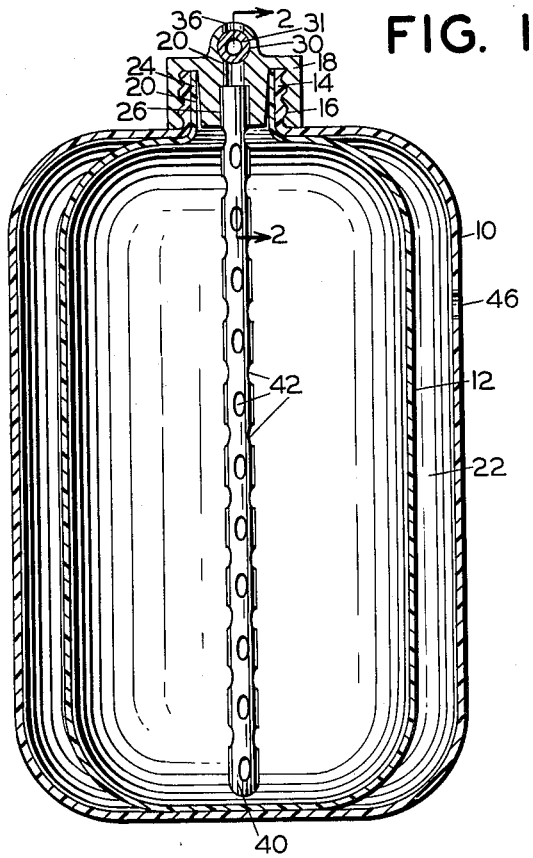
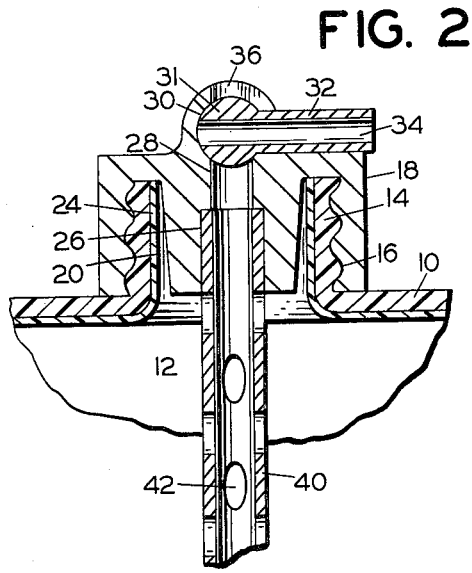
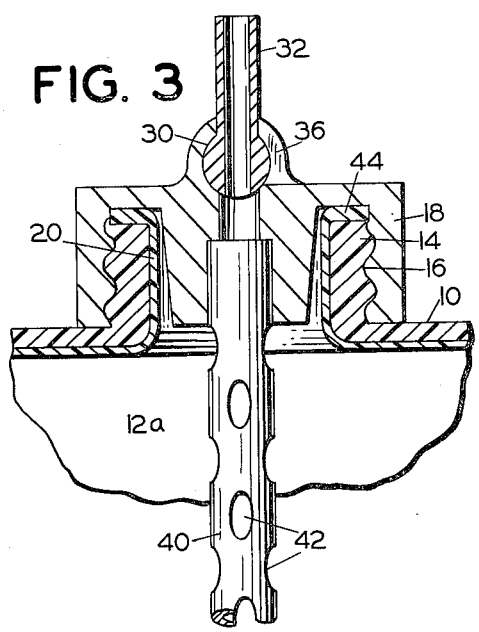
INVENTOR.
NED W. FRANDEEN
BY Eugene M. Eckelman
ATTORNEY

United States Patent Office 3,240,399
Patented Mar. 15, 1966

3,240,399
DISPENSING RECEPTACLE
Ned W. Frandeen, Rte. 2, Box 243, Troutdale, Oreg.
Filed Aug. 14, 1963, Ser. No. 302,128
2 Claims. (Cl. 222—211)

This invention relates to improvements in dispensing receptacles.

It is a primary object of the present invention to provide an improved dispensing receptacle which employs inner and outer container portions, the inner container portion being flexible and adapted to be compressed by pressure developed between it and the outer container portion for dispensing material.

More particular objects of the present invention are to provide a dispensing receptacle of the type described employing novel outlet means associated with the inner container portion which facilitates efficient removal of contents, both in providing positive ejection thereof and also facilitating substantially complete removal; to provide a dispensing receptacle of the type described constructed of inexpensively formed parts; and to provide a construction for such a receptacle facilitating ready assembly and filling of the receptacle.

Another object of the invention is to provide a dispensing receptacle which is inexpensive to manufacture.

In general, the present invention is concerned with a dispensing receptacle employing an inner container portion which holds the contents of the receptacle and an outer container portion which defines with the inner container portion a pressure chamber utilized to compress the inner container portion and eject its contents. In the present invention a central, perforated, substantially rigid, ejecting tube is employed through which contents of the inner container portion is discharged. Through the use of such ejecting tube, the inner container portion does not interfere with the discharge of contents even though said container portion is constructed of very lightweight and inexpensive sheet material.

The invention will be better understood and additional objects will become apparent from the following specification and claims, considered together with the accompanying drawings, wherein the numerals of reference indicate like parts and wherein:

FIGURE 1 is a central vertical sectional view of a dispensing receptacle embodying the principles of the present invention;

FIGURE 2 is an enlarged fragmentary sectional view taken on the line 2—2 of FIGURE 1 and showing a first form of inner container portion; and FIGURE 3 is an enlarged fragmentary sectional view taken on a line similar to FIGURE 2 but showing a second form of inner container portion.

Referring now in particular to the drawings and first to FIGURES 1 and 2, which show a first embodiment of the invention, the present receptacle comprises an outer container portion 10 and an inner container portion 12. Outer container portion 10 has a neck 14 with external threads 16 for threadedly receiving a cap 18. Inner container portion 12 is formed with a neck 20 which in the assembled condition of the receptacle is secured to the inner surface of neck 14. Such securement may be accomplished by heat sealing, adhesive, or other means. At any rate, it is imperative that this upper connection between the inner and outer container portions be airtight.

As apparent in FIGURE 1, the inner container portion 12 is of less lateral dimension than the outer container portion 10 to form an air chamber 22 therebetween, but is substantially the same length to seat on the bottom of the outer container portion whereby to receive support therefrom.

Cap 18 has a downwardly extending central boss 24 provided with a bottom recess or socket 26 and a passageway 28 leading upwardly from the recess and terminating in a top ball socket 30. Rotatably mounted in the socket 30 is a valve 31 having a nozzle 32 provided with a longitudinal bore 34. The upper defining wall of socket 30 is transversely slotted at 36 in alignment with nozzle 32 to permit upward rotation of the latter. The valve assembly is such that when the nozzle 32 is disposed at right angles to the passageway 28, as shown in FIGURE 2, the latter is shut off to seal the inner container portion. However, when the nozzle is rotated upwardly to the position of the FIGURE 3 embodiment the bore 34 thereof registers with the passageway 28 wherein material may be ejected from the container 12 as explained more fully hereinafter.

Secured integrally in the recess 26 of the cap 18 is an ejecting tube 40 which, as apparent in FIGURE 1, in the assembled condition of the receptacle is suspended within the inner container 12. This tube is perforated, having a plurality of holes 42 therein through which material from the inner container may enter the tube and be ejected out the nozzle 32.

FIGURE 3 shows a modified form of inner container portion, designated by the numeral 12a. This embodiment has an outwardly flanged top 44 adapted in assembled relation with the outer container portion 10 to seat on the top of neck 14. By this construction, an airtight connection between the inner and outer container portions is accomplished by clamping said flange between the neck 14 and the cap 18. In this embodiment, it is not necessary then to secure the neck portion 20 of the inner container portion to the inner surface of the neck 14 of the outer container as in the FIGURE 1 embodiment.

In the use of the present dispenser the inner container portion is first inserted within the outer container portion. In the FIGURE 1 embodiment, the outer surface of neck 20 of said inner container portion is secured to the inner surface of neck 14 of the outer container portion and then the contents inserted in the container portion 12. In the FIGURE 3 embodiment the container portion 12a is merely inserted and is held sufficiently firmly in place for filling by the flanges 44 supported on the neck 14. Thereupon, the cap 18, with the tube 40 secured in the recess 26 is mounted on the receptacle and the nozzle 32 is closed.

In one use the outer container 10 may be of flexible material and adapted for compression and distortion by the hand of the user. Since an air chamber 22 exists between the inner and outer container portions compression of the said outer container portion increases the air pressure in the chamber to in turn compress the inner container portion and eject contents as the nozzle 32 is opened. In the ejecting operation the contents is forced into the tube by means of the apertures 42 and then upwardly through the tube into the discharge passageway 28 and out nozzle 32. For the purpose of ejecting the contents of the inner container portion, the chamber 22 may be pressured in the production of the receptacle, or if desired the contents may be ejected by compressing the outer container portion with the hand to apply an inward distorting pressure on the inner container. In this latter regard, the outer container portion 10 is of sufficient resilience to return to its original shape when released, and it is necessary that an aperture 46 be provided in this container portion to allow it to expand when released and that such aperture be sealed, as with the thumb or one of the fingers, when said container portion is compressed.

By use of the tube 40, the inner container portion 12 may be constructed of very light and inexpensive sheet material, and even though this inner container portion collapses as the material is used it will in no way plug up outlet means of the receptacle. Thus, the contents of the inner container is efficiently and substantially completely ejected.

As a further feature of the invention, the inner container portion 12 can be constructed of an elastic or resilient material and is stretched as it is initially filled. Then as the contents are ejected, the inner surface of the portion 12 accordingly decreases, resulting in a progressively less surface area on which the contents may cling and contributing further to complete emptying of the receptacle. In this regard, the portion 12 when empty would be fully collapsed on itself to have a minimum of inner surface area when emptied.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A dispensing receptacle comprising an outer container having an open neck portion, a cap threadedly engageable with said outer container and having an outlet passageway, an inner flexible container interiorly of said outer container adapted to receive material to be dispensed, an open neck portion on said inner container secured in sealed engagement with the neck portion of said outer container to form an air-tight joint, said inner container being of a dimension less than said outer container sufficient to form an air chamber therebetween wherein material in said inner container is adapted to be dispensed by pressure between said containers, and a perforated tube attached to said cap and projecting downwardly in said inner container in suspended relation, said tube communicating at its upper end with the outlet passageway in said cap to eject material from said inner container and to prevent collapse of said inner flexible container into said outlet passageway.

2. A dispensing receptacle comprising an outer container having an open neck portion, a cap threadedly engageable with said outer container and having an outlet passageway, a downwardly extending boss on said cap having a bottom socket communicating with said outlet passageway, an inner flexible container interiorly of said outer container adapted to receive material to be dispensed, an open neck portion on said inner container terminating in its upper end in an outwardly directed flange seated on the top of said outer container neck portion and sealed thereagainst by said cap to form an air-tight joint, and a perforated tube secured in said socket for attachment to said cap, said tube projecting downwardly in said inner container in suspended relation and communicating at its upper end with the outlet passageway in said cap to eject material from said inner flexible container into said outlet passageway.

References Cited by the Examiner
UNITED STATES PATENTS

| | | | |
|---|---|---|---|
| 2,608,320 | 8/1952 | Harrison | 222—386.5 X |
| 2,671,578 | 3/1954 | McBean | 222—95 |
| 2,727,658 | 12/1955 | Mart | 222—536 |
| 2,743,038 | 4/1956 | Ferries | 222—209 X |
| 2,876,768 | 3/1959 | Schultz | 222—386.5 X |
| 2,879,785 | 3/1959 | Vesterdal et al. | 222—386.5 X |
| 2,896,825 | 7/1959 | Jackson | 222—215 X |
| 3,067,810 | 12/1962 | Mozic | 222—386.5 X |
| 3,157,314 | 11/1964 | Nadler | 222—215 X |

FOREIGN PATENTS 66,802    3/1957    France.

LOUIS J. DEMBO, *Primary Examiner.*

C. R. CARTER, T. LAMPE, *Assistant Examiners.*